(12) United States Patent
Hansson

(10) Patent No.: US 8,845,243 B2
(45) Date of Patent: Sep. 30, 2014

(54) REAMING TOOL AS WELL AS A HEAD AND A CUTTING INSERT THEREFOR

(75) Inventor: Per Hansson, Gävle (SE)

(73) Assignee: Sandvik Intellectual Property AB, Sandviken (SE)

(*) Notice: Subject to any disclaimer, the term of this patent is extended or adjusted under 35 U.S.C. 154(b) by 251 days.

(21) Appl. No.: 13/336,055

(22) Filed: Dec. 23, 2011

(65) Prior Publication Data

US 2012/0257939 A1 Oct. 11, 2012

(30) Foreign Application Priority Data

Dec. 28, 2010 (SE) ...................................... 1051377

(51) Int. Cl.
*B23D 77/02* (2006.01)
*B23B 27/16* (2006.01)

(52) U.S. Cl.
CPC ......... *B23D 77/025* (2013.01); *B23B 2200/128* (2013.01); *B23B 27/1622* (2013.01); *B23B 2205/12* (2013.01); *B23D 2277/84* (2013.01); *B23D 2277/204* (2013.01); *B23B 2200/369* (2013.01); *Y10S 408/713* (2013.01)
USPC ............ 408/188; 408/200; 408/233; 408/713

(58) Field of Classification Search
CPC ... B23D 77/00; B23D 77/02; B23C 2200/161
USPC .................. 408/188, 187, 200, 227, 233, 713
See application file for complete search history.

(56) References Cited

U.S. PATENT DOCUMENTS

| | | | |
|---|---|---|---|
| 3,137,917 A | | 6/1964 | Dowd |
| 5,443,334 A | * | 8/1995 | Pantzar .......................... 407/113 |
| 5,685,670 A | * | 11/1997 | Satran .............................. 407/42 |
| 6,004,081 A | * | 12/1999 | Hellstrom et al. ............ 407/103 |
| 6,056,484 A | * | 5/2000 | Mitchell et al. ................. 407/36 |
| 6,126,366 A | * | 10/2000 | Lundblad ....................... 407/102 |
| 6,238,133 B1 | * | 5/2001 | DeRoche et al. .......... 403/359.1 |

(Continued)

FOREIGN PATENT DOCUMENTS

| | | |
|---|---|---|
| DE | 82 30 997 U1 | 4/1984 |
| DE | 3602427 A1 * | 7/1987 |

(Continued)

OTHER PUBLICATIONS

European Search Report for Application No. 11192701.8, dated May 9, 2012.

*Primary Examiner* — Daniel Howell
*Assistant Examiner* — Nicole N Ramos
(74) *Attorney, Agent, or Firm* — Morgan, Lewis & Bockius LLP

(57) ABSTRACT

Reaming tool includes a head and one or more detachable cutting inserts fixed in seats. The seat includes radial, tangential and axial support surfaces, while the cutting insert has a mirror-symmetrical polyhedron shape comprising six limiting surfaces, viz. two chip surfaces and four clearance surfaces, a number of alternately usable identical cutting edges formed in the transitions between the chip and clearance surfaces. The cutting insert has a rhombic cross-sectional shape with four clearance surfaces, which meet each other in pairs at obtuse angles in two opposite corners, and which, along each individual chip surface, form two cutting edges alternately usable by indexing the cutting insert. The seat additionally includes a slope surface forming an obtuse angle with the radial support surface, suitably of the same magnitude as the obtuse angle between the clearance surfaces of the cutting insert. Tool head and reaming insert for the tool are disclosed.

16 Claims, 7 Drawing Sheets

(56) References Cited

U.S. PATENT DOCUMENTS

| | | | |
|---|---|---|---|
| 6,607,334 B2* | 8/2003 | Satran et al. | 407/35 |
| 6,929,427 B2* | 8/2005 | Satran | 407/42 |
| 7,794,182 B2* | 9/2010 | Lehto et al. | 407/35 |
| 8,388,272 B2* | 3/2013 | De Souza Filho et al. | 407/103 |
| 2003/0086766 A1 | 5/2003 | Andras | |
| 2010/0111621 A1 | 5/2010 | Harif | |
| 2010/0124465 A1* | 5/2010 | Morrison et al. | 407/42 |
| 2010/0183384 A1 | 7/2010 | Kruszynski et al. | |
| 2010/0242529 A1* | 9/2010 | Fujimoto et al. | 62/470 |
| 2011/0103904 A1* | 5/2011 | Dufour et al. | 407/47 |

FOREIGN PATENT DOCUMENTS

| | | |
|---|---|---|
| DE | 3610016 A1 * | 10/1987 |
| DE | 10 2004 008 167 A1 | 9/2005 |
| FR | 2 927 555 A3 | 8/2009 |
| WO | WO 01/26854 A1 | 4/2001 |
| WO | WO 2008/017383 A1 | 2/2008 |
| WO | WO 2009/030455 A1 | 3/2009 |
| WO | WO 2010/069541 A1 | 6/2010 |

* cited by examiner

REAMING TOOL AS WELL AS A HEAD AND A CUTTING INSERT THEREFOR

RELATED APPLICATION DATA

This application is based on and claims priority under 37 U.S.C. §119 to Swedish Application No. 1051377-8, filed Dec. 28, 2010, the entire contents of which are incorporated herein by reference.

FIELD OF THE DISCLOSURE

In a first aspect, the present disclosure relates to a reaming tool of the type that comprises a driving rod and a head that has a rotationally symmetrical basic shape and is equipped with one or more detachable cutting inserts, which head comprises front and rear end surfaces, an envelope surface concentric with a centre axis, and a seat that is countersunk in the envelope surface and includes three support surfaces, one of which is a radial support surface and another one a tangential support surface, the cutting insert having the shape of a mirror-symmetrical polyhedron that comprises six limiting surfaces, two opposite and mutually parallel ones of which are equidistantly separated from a central symmetry plane and form chip surfaces that connect to limiting surfaces serving as clearance surfaces via alternately usable, identical cutting edges, and the cutting insert being held fixed in the seat by means of a clamping member. In additional aspects, the present disclosure also relates to a tool head and a cutting insert as such.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Tools of the above-related kind are used to ream holes in metallic workpieces by chip removing or cutting machining with the purpose of giving the holes a cylindrical, smooth surface having an accurately determined diameter. A product, which advantageously can be machined by means of the tool, is tube blanks, the interior of which for different reasons has to be dimensionally accurate and have a high surface smoothness. A usual method for, in practice, carrying out machining of just tube blanks is so-called pull boring. The tool is then connected with one end of a drawbar, which has an outer diameter that is smaller than the inner diameter of the tube blank, and which in a first step is brought through the tube blank so that the tool can be applied on the free end thereof, e.g. via a threaded joint, after which the reaming operation is undertaken by a combination of rectilinear and rotary motions between the tool and the tube blank. Usually, the tool is fed longitudinally by being pulled through the interior of the tube blank without rotating, at the same time as the tube blank is brought to rotate. By these relative motions, the cutting inserts detachably mounted on the tool head will, in a way characteristic of cutting machining, remove chips from the hole wall while generating a cylinder surface having good dimensional accuracy and high surface smoothness.

The prismatic cutting inserts, which have been used in previously known reaming tools of the kind in question, are formed with two opposite chip surfaces; an upper side and a longer under side; two opposite end surfaces; as well as two clearance surfaces that extend from the upper side toward the end surfaces and lean downward toward the same. Therefore, along each chip surface, there is only one cutting edge usable for one and the same tool, viz. in a transition toward an individual clearance surface. This means that the cutting insert includes in total only two alternately usable cutting edges. Because the volume of the cutting insert, and thereby the quantity of costly material (cemented carbide), thus becomes disproportionately great in relation to the number of usable cutting edges, the operating economy for the user per cutting insert will be fairly mediocre. Accordingly, the known cutting insert is only invertible, but not indexable so as to allow utilization of further edges of the cutting insert as cutting edges. Another disadvantage of the known cutting inserts is that the same tend to be displaced in the appurtenant seat or even come loose from the same in case the same are subjected to a reverse interaction of forces. Although the present reaming method usually is reliable and well functioning, accordingly, every now and then mishaps occur requiring that the machining operation is interrupted and that the tool is retracted out of the hole. Examples of mishaps are that one or more cutting inserts become damaged or come loose from the tool head, or that the driving machine facility stops. In connection with such retractions, the intact cutting inserts of the tool head may come to be jammed against the interior of the tube blank, wherein the cutting inserts are subjected to a reversed interaction of forces that tends to dislodge the same out of the appurtenant seats. Instead of being held pressed automatically against all support surfaces in the seat by the cutting forces during operation, the cutting insert is subjected to an aim to be distanced from above all the axial support surface, but also the tangential support surface. If a screw is used as clamping member, this has, however, poor chances of withstanding the reversed forces. Characteristic of a screw is that it has good tensile strength, but considerably inferior bending strength. Therefore, if the tool has a moderate diameter and the cutting inserts as well as the screws are small, it easily occurs that the screws yield to the unpredicted, reversed forces that are applied to the cutting insert.

SUMMARY

In a first aspect, the present disclosure aims at obviating the above-mentioned disadvantages of reaming tools previously known (by commercialization), and at providing an improved tool of this type. Therefore, a primary object is to provide a reaming tool, the detachable cutting inserts of which can be manufactured with more than two cutting edges. An additional object is to provide a reaming tool, the detachable cutting inserts of which have a minimal volume and thereby a minimal material cost in relation to the number of usable cutting edges, all with the purpose of optimizing the operating economy for the user. It is also an object to provide a reaming tool, the undamaged, intact cutting inserts of which remain reliably in the mounted locations thereof in the seat of the tool head in connection with possible extraction of the tool out of a hole being reamed, more precisely with the ultimate purpose of facilitating the extraction and reducing the waste of time in connection with possible machine malfunctions.

According to the disclosure, at least the primary object is achieved by the cutting insert, for example, having a rhombic cross-sectional shape in the symmetry plane (SP1) and including four clearance surfaces, which meet each other in pairs at obtuse angles (β) in two opposite corners, and which, along each individual chip surface, together with the same, form two cutting edges alternately usable by the indexing of the cutting insert, and that the seat, in addition to the radial and tangential support surfaces, includes a slope surface that forms an obtuse angle with the radial support surface. Preferred embodiments of the disclosed reaming tool are further defined below In additional aspects, the disclosure also aims at providing a tool head as well as a reaming insert as such that, by means of improved properties, guarantee a good function of the assembled tool. The unique features of the tool head as well as the individual cutting insert are disclosed herein.

An exemplary embodiment of a reaming tool comprises a driving rod, a head that has a rotationally symmetrical basic shape and is equipped with one or more detachable cutting inserts, and a clamping member, wherein the head comprises front and rear end surfaces, an envelope surface concentric with a centre axis (C), and a seat that is countersunk in the envelope surface and includes three support surfaces, one of which is a radial support surface (18) and another one a tangential support surface, wherein the cutting insert is held fixed in the seat by means of the clamping member, wherein the cutting insert has the shape of a mirror-symmetrical polyhedron comprising six limiting surfaces, two opposite and mutually parallel ones of which are equidistantly separated from a central symmetry plane (SP1) and form chip surfaces that connect to limiting surfaces serving as clearance surfaces via alternately usable, identical cutting edges, wherein the cutting insert has a rhombic cross-sectional shape in the symmetry plane (SP1) and includes four clearance surfaces, which meet each other in pairs at obtuse angles ($\beta$) in two opposite corners, and which, along each individual chip surface, together with the same, form two cutting edges alternately usable by the indexing of the cutting insert, and wherein the seat, in addition to the radial and tangential support surfaces, includes a slope surface that forms an obtuse angle with the radial support surface.

An exemplary embodiment of a reaming insert for a reaming tool including a driving rod, a head that has a rotationally symmetrical basic shape and is equipped with one or more detachable cutting inserts, and a clamping member, wherein the head comprises front and rear end surfaces, an envelope surface concentric with a centre axis (C), and a seat that is countersunk in the envelope surface and includes three support surfaces, one of which is a radial support surface and another one a tangential support surface, wherein the cutting insert is held fixed in the seat by means of the clamping member, wherein the cutting insert has the shape of a mirror-symmetrical polyhedron comprising six limiting surfaces, two opposite and mutually parallel ones of which are equidistantly separated from a central symmetry plane (SP1) and form chip surfaces that connect to limiting surfaces serving as clearance surfaces via alternately usable, identical cutting edges, wherein the cutting insert has a rhombic cross-sectional shape in the symmetry plane (SP1) and includes four clearance surfaces, which meet each other in pairs at obtuse angles ($\beta$) in two opposite corners, and which, along each individual chip surface, together with the same, form two cutting edges alternately usable by the indexing of the cutting insert, and wherein the seat, in addition to the radial and tangential support surfaces, includes a slope surface that forms an obtuse angle with the radial support surface, comprises four clearance surfaces, wherein the reaming insert has a shape of a mirror-symmetrical polyhedron comprising six limiting surfaces, two opposite and mutually parallel ones of which are equidistantly separated from a central symmetry plane (SP1) and serve as chip surfaces that connect to limiting surfaces serving as clearance surfaces via alternately usable cutting edges, wherein the reaming insert has a rhombic cross-sectional shape in the symmetry plane (SP1), and wherein the four clearance surfaces meet each other in pairs at obtuse angles ($\beta$) in two opposite corners, and which, along each individual chip surface, together with the same, form two cutting edges alternately usable by the indexing of the cutting insert.

An exemplary embodiment of a rotationally symmetrical tool head for a reaming tool including a driving rod, a head that has a rotationally symmetrical basic shape and is equipped with one or more detachable cutting inserts, and a clamping member, wherein the head comprises front and rear end surfaces, an envelope surface concentric with a centre axis (C), and a seat that is countersunk in the envelope surface and includes three support surfaces, one of which is a radial support surface and another one a tangential support surface, wherein the cutting insert is held fixed in the seat by means of the clamping member, wherein the cutting insert has the shape of a mirror-symmetrical polyhedron comprising six limiting surfaces, two opposite and mutually parallel ones of which are equidistantly separated from a central symmetry plane (SP1) and form chip surfaces that connect to limiting surfaces serving as clearance surfaces via alternately usable, identical cutting edges, wherein the cutting insert has a rhombic cross-sectional shape in the symmetry plane (SP1) and includes four clearance surfaces, which meet each other in pairs at obtuse angles ($\beta$) in two opposite corners, and which, along each individual chip surface, together with the same, form two cutting edges alternately usable by the indexing of the cutting insert, and wherein the seat, in addition to the radial and tangential support surfaces, includes a slope surface that forms an obtuse angle with the radial support surface, comprises front and rear end surfaces, an envelope surface concentric with a centre axis (C), and a seat for the receipt of a cutting insert, the seat countersunk in the envelope surface and includes three support surfaces, one of which is a radial support surface and another one a tangential support surface, wherein the seat, in addition to said radial and tangential support surfaces, includes a slope surface that forms an obtuse angle with the radial support surface.

BRIEF DESCRIPTION OF THE DRAWING

The following detailed description of preferred embodiments can be read in connection with the accompanying drawings in which like numerals designate like elements and in which.

DETAILED DESCRIPTION

In the following text, there will be described a large number of surfaces and edges on a cutting insert having the shape of a prismatic body as well as in a seat in which the cutting insert is mounted. In order to distinguish these surfaces and edges with the purpose of providing conceptual clarity, henceforth, there are used denominations that vary depending on if they relate to the geometrical shape of the cutting body and seat, respectively, or to the function of the surfaces/edges in connection with chip removal. Accordingly, the concept "limiting surfaces" is found in connection with the shape of the cutting insert being described, while the concepts "chip surfaces and clearance surfaces, respectively," are used when the function of the surfaces will be made clear. In an analogous way, "edge" is used in connection with the insert shape, but if an edge is utilized for chip removal or surface wiping, the concepts "cutting edge" and "secondary edge" or "wiper edge", respectively, are used. If an edge only has the purpose of delimiting two limiting surfaces from each other, but is not utilized for machining purposes, then the same will, on the other hand, be denominated "boundary edge or boundary line". Furthermore, the active surfaces in the individual seat in the tool head are generally denominated "support surfaces", while the surfaces on the cutting insert that are pressed against the support surfaces are denominated "contact surfaces". Furthermore, the concepts "invertible" and "indexable", respectively, are found. The fact that the cutting insert "is inverted" means that a previously outwardly exposed chip surface faces inward to a support surface with the purpose of exposing another, mirror-symmetrical chip surface outward. The fact that the cutting insert "is indexed" means that the same—after dismounting—is rotated 180° and after that remounted in the seat. The object of inversion as well as indexing of the cutting insert is, in the usual way, to change into an unused cutting edge, when a previously active cutting edge has been worn out, wherein each individual cutting edge should assume one and the same spatial position in the tool head.

As a matter of form, it should also be pointed out that the cutting insert usually is manufactured from cemented carbide or another, hard and wear-resistant material, while the tool head is made of a softer material, in particular steel. The materials in the workpieces to be machined are primarily metallic, although also other materials, e.g. composites, may occur.

Figure 1:
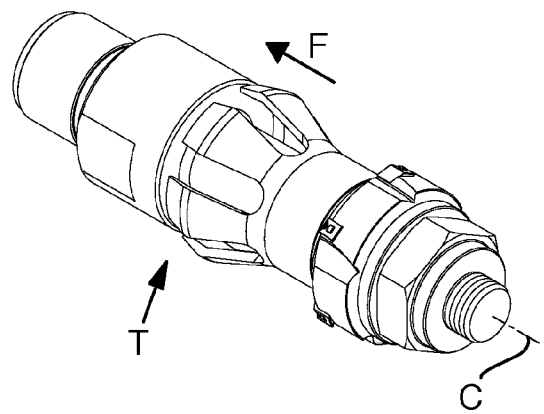
FIG. 1 is a perspective view of the disclosed reaming tool in the assembled state.
Figure 2:
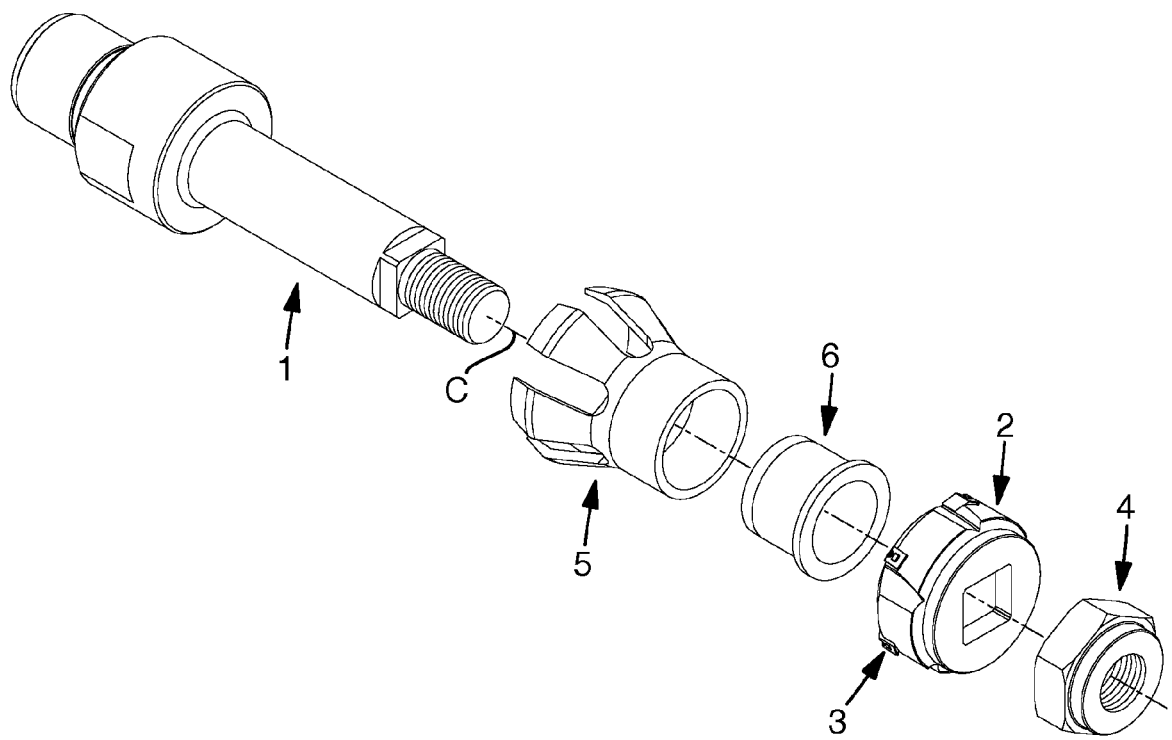
FIG. 2 is a perspective exploded view of the same tool.
Figure 3:
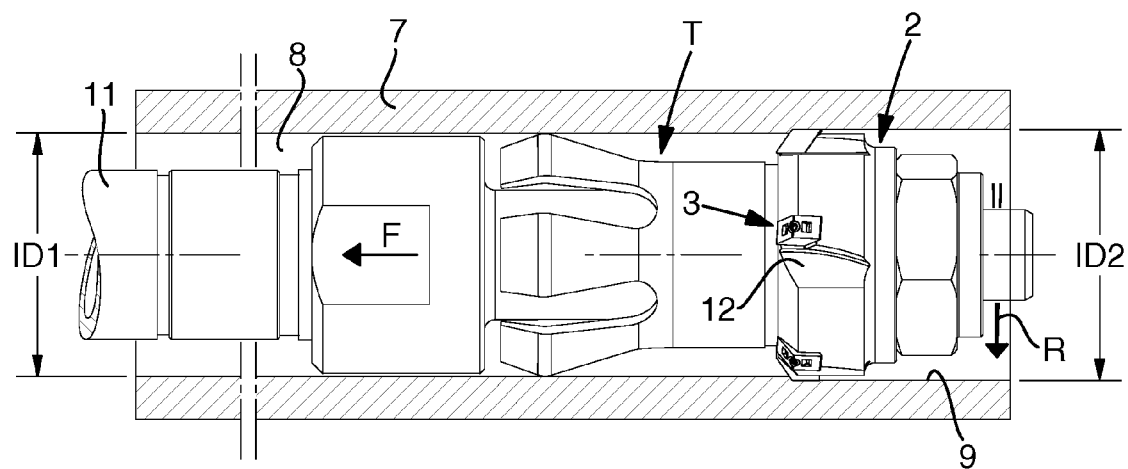
FIG. 3 is a side view of the tool during the reaming of a hole in a workpiece in the form of a tube blank, which in turn is shown in longitudinal section.
Figure 4:
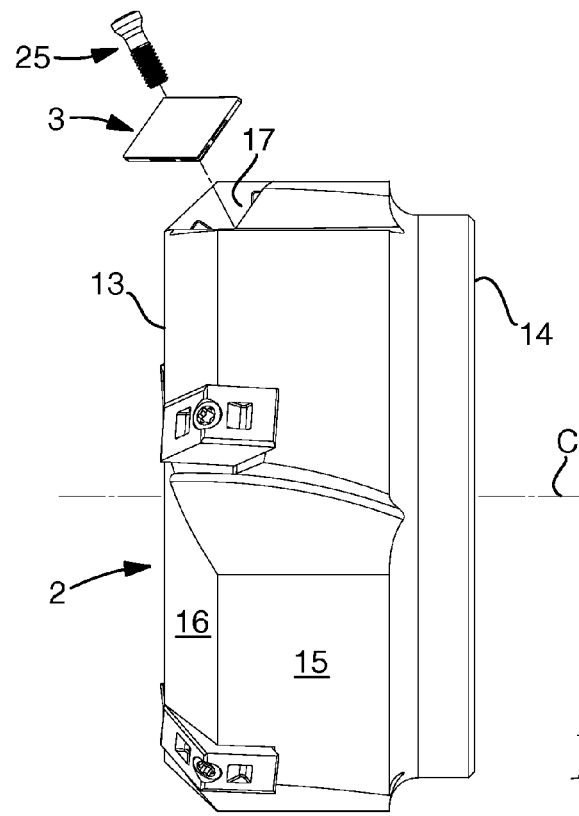
FIG. 4 is an exploded side view of a head that is included in the tool and has mounted cutting inserts.
Figure 5:
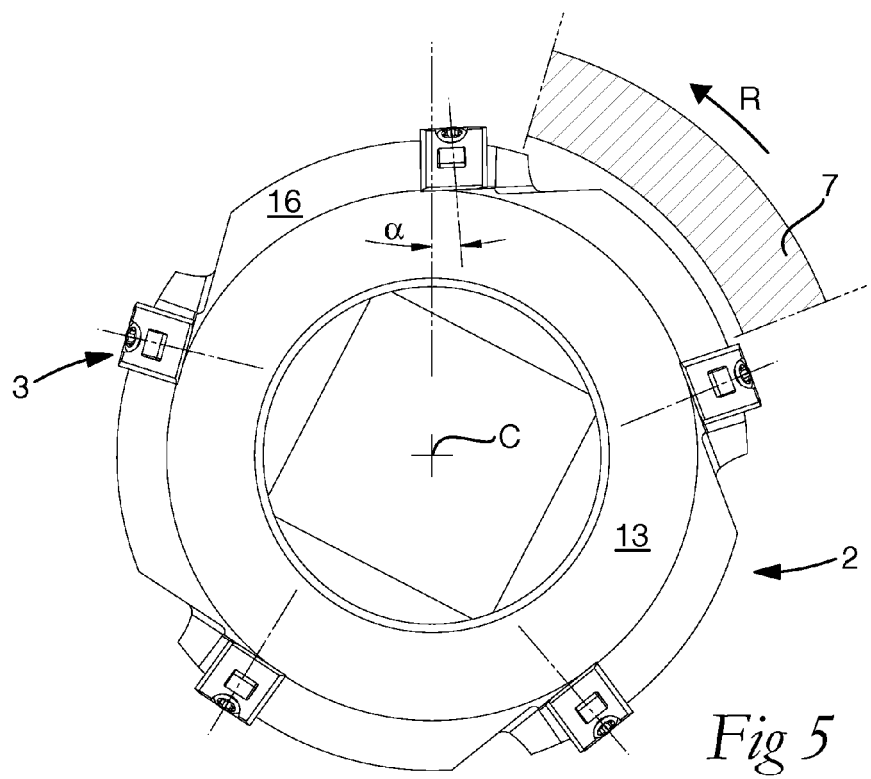
FIG. 5 is a front view of the head in the same state.
Figure 6:
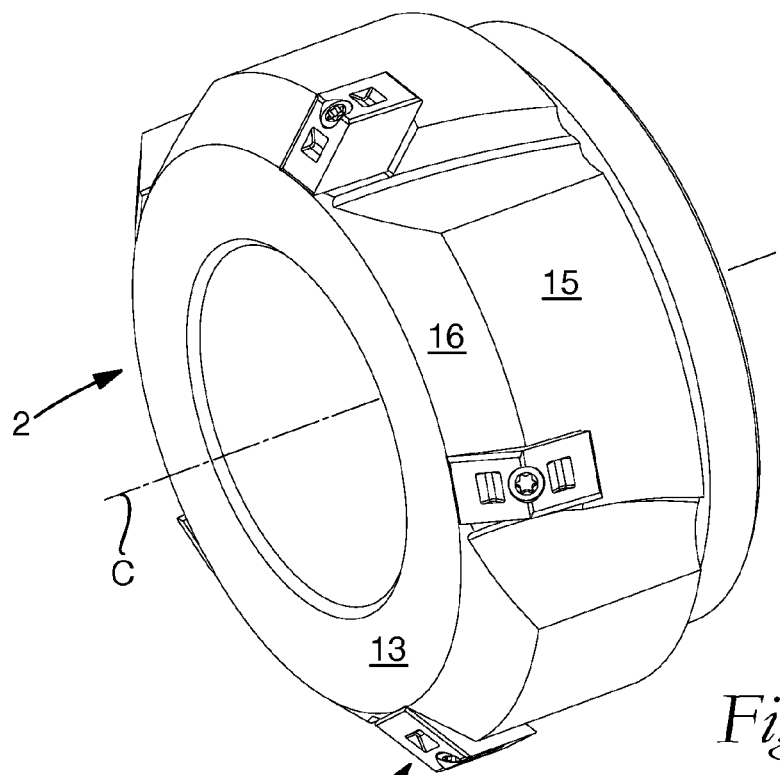
FIG. 6 is a perspective view of the tool head with the cutting inserts mounted.
Figure 7:
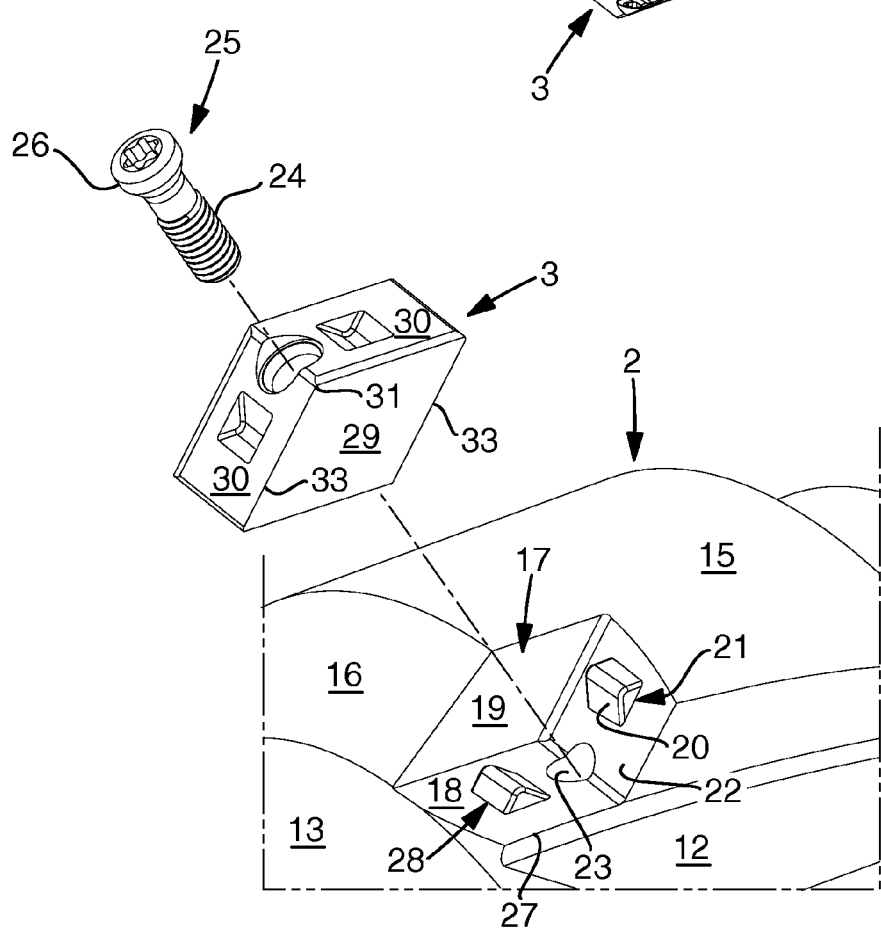
FIG. 7 is an enlarged, perspective exploded view showing a seat included in the tool head as well as a cutting insert separated from the same together with a clamping member for the cutting insert.

The reaming tool T shown in FIGS. 1-3 includes three main components, viz. a driving rod 1, a head 2 and a number of cutting inserts 3 detachably mounted on the head. In the shown embodiment of the tool, there are further included a lock member in the form of a nut 4, a forerunner 5, and a bushing 6 acting between the same and the driving rod. In operation, a reaming tool can generally either rotate and the workpiece be fed longitudinally, or be fed longitudinally while the workpiece is rotated, in order to provide the requisite relative motions between the same. In the example shown, the last-mentioned alternative is preferred, i.e., the tool T is fed longitudinally, viz. in the direction of the arrow F, while a workpiece 7 shown in the form of a tube blank is rotated in the direction of the arrow R. When the concepts "front" and "rear", respectively, are used in the following description, they relate to the longitudinal feed direction F. Accordingly, in FIGS. 1 and 2, the tool is shown from behind. If the tool is viewed from the front according to FIG. 5, in this case, the tube blank 7 rotates counter-clockwise around the centre axis C, with which the driving rod 1 as well as the components 2, 4, 5 and 6 are concentric.

The object of the present machining method, which by those skilled in the art is denominated "pull boring", is to ream the hole 8 of the workpiece or tube blank 7 and provide a cylinder surface 9 having good dimensional accuracy and high surface smoothness. Initially, the tube blank 7 has an inner diameter ID1 that may be arbitrarily great, provided that it is smaller than the desired, final inner diameter ID2 of the machined cylinder surface 9. Neither is the surface finish of the inside of importance. In a first step, a drawbar 11, e.g. in the form of a tube having a diameter that is smaller than ID1, is brought through the hole 8 so that the driving rod 1 of the assembled tool T can be applied to the rear, protruding end of the drawbar, e.g. via a threaded joint. Next, the drawbar and the tool are pulled back through the hole 8, at the same time as the tube blank 7 is brought to rotate. In doing so, the cutting inserts 3 remove chips that are evacuated in the backward direction out of the tube blank, more precisely via evacuation channels 12 in the envelope surface of the tool head 2. In order to facilitate said evacuation and simultaneously guarantee that the chips do not damage the generated cylinder surface 9, a fluid, e.g. water, is flushed rearward through the tube blank.

When the tool is assembled, first the forerunner 5 and the bushing 6 are put on the driving rod 1, and then the head 2. In order to rotationally secure the head 2, this includes an opening having a polygonal (square) cross-sectional shape in which an analogously polygon-shaped driver on the driving rod engages. Finally, the head 2 is fixed by means of the lock nut 4. The forerunner 5, which includes a plurality of elastic fingers, which are resiliently tensioned against the interior of the tube blank 7 in order to centre and guide the trailing head, and which follow the tube blank in its rotation, can freely rotate in relation to the drawbar 1 by means of the bushing 6 serving as bearing.

Reference is now made to FIGS. 4-7, which show how the head or the basic body 2 includes front and rear end surfaces 13, 14 and a cylindrical envelope surface 15, which is concentric with the centre axis C and transforms into the front, plane end surface 13 via a conical surface 16. In the envelope surface 15, a number of (in the example, five) seats 17 for the cutting insert are formed. In this case, said seats 17 open partly in the envelope surface 15, partly in the cone surface 16. In each seat, three support surfaces are included to carry the radial, tangential and axial cutting forces that act on the cutting insert during chip removal. Among these support surfaces, a radial support surface is designated 18 and a tangential support surface 19. In this case, a third support surface in the form of an axial support surface 20 is formed on a step 21 of a slope surface 22 that extends at an obtuse angle to the radial support surface 18 as well as perpendicular to the tangential support surface 19. Although all support surfaces are generally plane and shown in the form of solitary surfaces, certain surfaces, e.g. the tangential support surface 19, may be divided into a plurality of part surfaces via shallow ditches with the purpose of counteracting overdetermination of the cutting insert and guaranteeing an exact positioning of the same in the seat. In addition, a countersunk clearance surface for an edge portion of the cutting insert is formed in the transition between the surfaces 19 and 22. In a traditional way, the seat assumes a tipped-in spatial position (indicated by means of the angle α in FIG. 5) in the head with the purpose of providing the requisite clearances for the mounted cutting insert.

In the transition between the radial support surface 18 and the slope surface 22, a hole 23 mouths having a female thread (lacks designation) for the co-operation with a male thread 24 of a screw 25 serving as clamping member and having the purpose of fixing the cutting insert in the seat 17. The screw 25, which includes a conical head 26, is advantageously spring biased in order to, upon tightening, press the cutting insert not only against the surfaces 18 and 22 but also against the surface 19. At the boundary line 27, which is situated at a distance from the tangential support surface 19 and runs approximately parallel to the same, the radial support surface 18 transforms into one of the aforementioned channels 12.

In the shown, preferred embodiment, a stop lug 28 placed along the radial support surface 18 is also included, the function of which will be described later.

Reference is now made to FIGS. 8-13, which in detail illustrate the design of the disclosed reaming insert.

Figure 8:
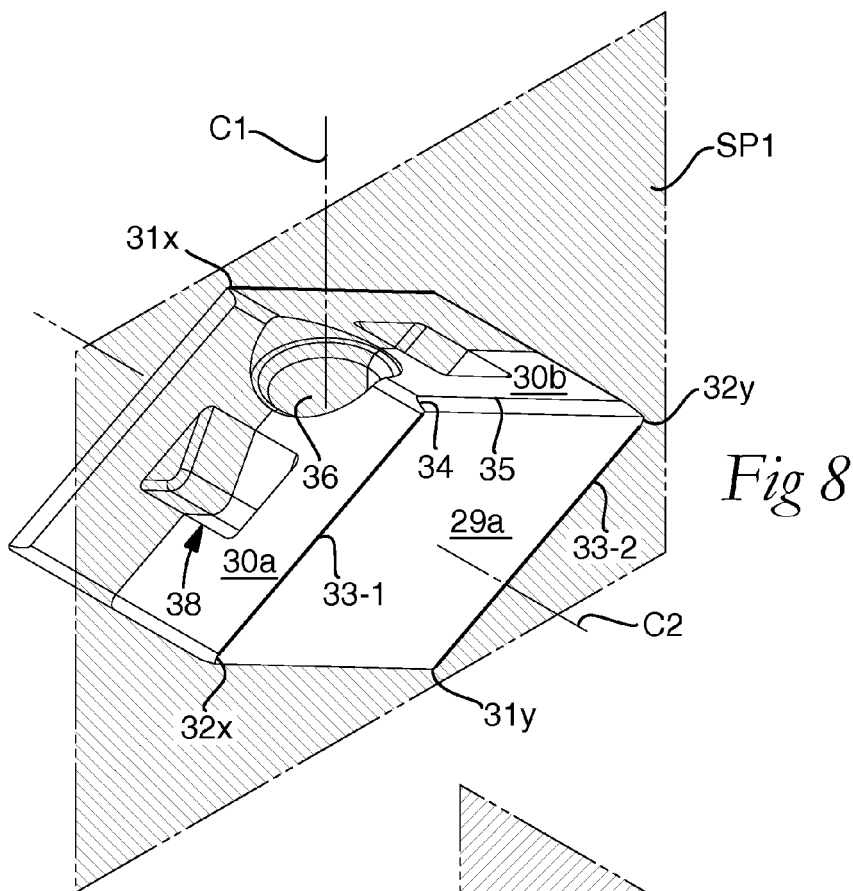
FIG. 8 is an enlarged bird's eye view of the individual cutting insert.
Figure 9:
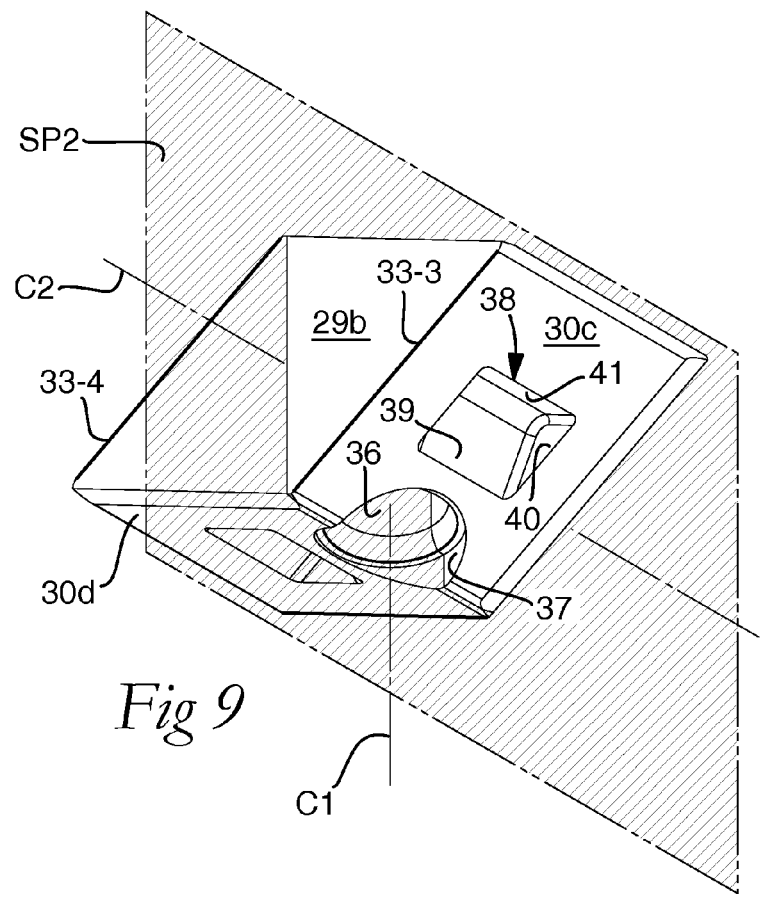
FIG. 9 is a worm's eye view of the same cutting insert.
Figure 10:
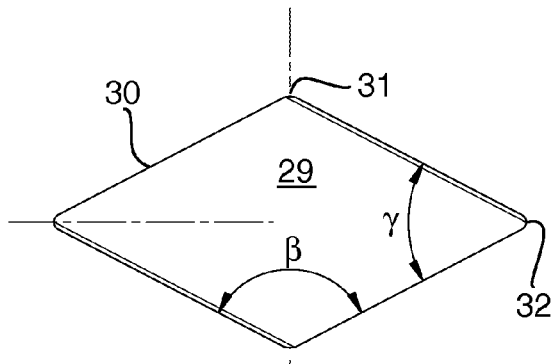
FIG. 10 is a side view of the cutting insert.
Figure 11:
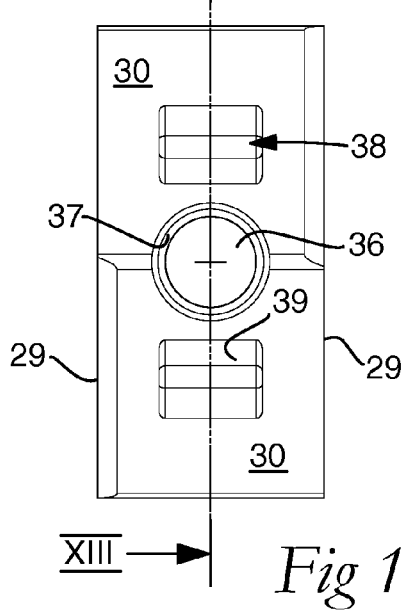
FIG. 11 is a planar view from above (or from below) of the cutting insert.
Figure 12:
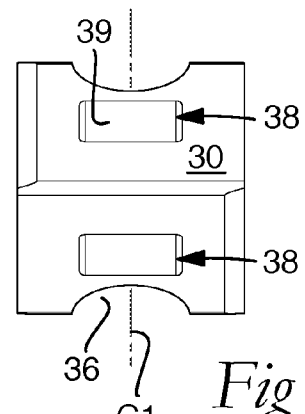
FIG. 12 is an end view of the cutting insert.

Generally, the cutting insert has the shape of a polyhedron having six plane or limiting surfaces, viz. two opposite and mutually parallel surfaces 29, which henceforth will be denominated "chip surfaces", and four surfaces 30, which extend between the two chip surfaces 29, and serve as clearance surfaces. Although these clearance surfaces 30 are identical, in FIGS. 8 and 9, the same have been provided with the suffixes "a", "b", "c" and "d", respectively, in order to be mutually distinguishable. In an analogous way, the two identical chip surfaces 29 are distinguished by means of the suffixes "a" and "b", respectively. In the other drawing figures, said suffixes are omitted. In FIG. 8, SP1 designates a symmetry plane that is parallel to the chip surfaces 29a, 29b and situated halfway between the same. A second symmetry plane SP2 extends perpendicular to the symmetry plane SP1, and where these symmetry planes intersect each other at right angles, there is a first centre axis C1.

Exemplary embodiments of the disclosed reaming insert has a rhombic basic shape so far that each arbitrary cross-section that is parallel to the chip surfaces 29a, 29b is rhomb-shaped.

In the drawings, said chip and clearance surfaces have been shown in the form of plane surfaces, which, however, is something that does not exclude that the topographic shape of the surfaces inside the outer boundary lines may deviate from the genuinely plane shape. In particular, the chip surfaces 29 may be formed with miscellaneous, non-plane part surfaces having the purpose of guiding and/or breaking the chips that are removed.

The clearance surfaces 30 meet each other in pairs at obtuse angles β (see FIGS. 10 and 13) in two opposite corners designated 31x, 31y. Accordingly, the clearance surfaces 30a, 30b meet in the corner 31x, while the clearance surfaces 30c, 30d meet in the corner 31y. For simple geometrical reasons, it follows that the surfaces 30a, 30d and 30b, 30c, respectively, meet each other in pairs in acute-angled corners 32x, 32y. Furthermore, it should be pointed out that a second centre axis, which intersects the centres of the two rhomb-shaped chip surfaces 29a, 29b, is designated C2 (see FIGS. 8 and 9). Between each individual chip surface and the connecting clearance surfaces, two cutting edges are formed that are usable in the shown tool, viz. the cutting edges 33-1, 33-2 between the chip surface 29a and the clearance surfaces 30a, 30b, as well as the cutting edges 33-3, 33-4 between the chip surface 29b and the clearance surfaces 30b, 30d. Via a short secondary or wiper edge 34, the individual, active cutting edge, e.g. the cutting edge 33a, transforms into an edge being behind, which during machining clears from the generated surface. The wiper edge 34 is provided by a chamfer surface 35 having been formed between the chip surface 29a and the clearance surface 30b (the other three chamfer surfaces and wiper edges lack designations in order not to unnecessarily overload FIGS. 8 and 9).

In the example, β amounts to 135° and γ consequently to 45°. These angles may vary upward as well as downward. However, β should amount to at least 110° and at most 160° and suitably be in the range of 120-150°.

In the example shown, when the clamping member consists of the screw 25, a through hole 36 runs through the cutting insert, more precisely between the obtuse corners 31x and 31y. In the opposite ends thereof, this hole 36 includes a ring-shaped, conical countersink 37, which may house the screw head 26 irrespective of which index position the cutting insert has in relation to the centre axis C2 (indexing is carried out by the cutting insert being rotated 180° around the centre axis C2).

It should be noted that all clearance surfaces 30 extend perpendicular to the symmetry plane SP1 and thereby also perpendicular to the chip surfaces 29.

Figure 13:
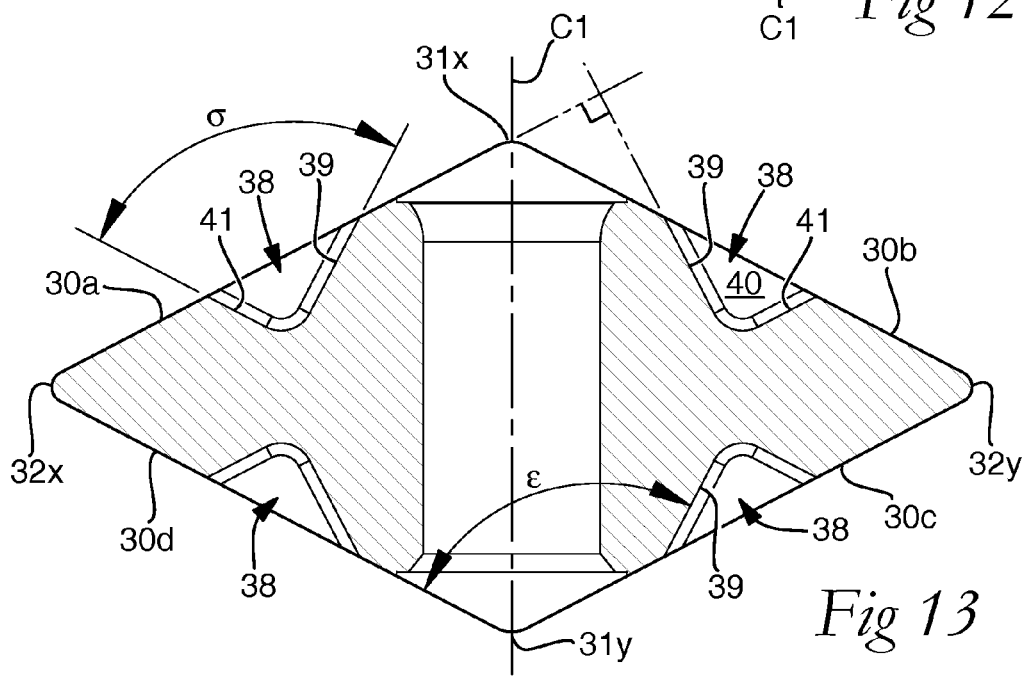
FIG. 13 is an enlarged longitudinal section XIII-XIII in FIG. 11.

In each one of the four clearance surfaces 30, there is countersunk a cavity 38 that includes four limiting surfaces, one of which, viz. the surface 39, forms an axial contact surface for pressing against the axial support surface 20 of the step 21 in the seat 17. The other limiting surfaces in the cavity consist of two side surfaces 40 as well as of a clearance surface 41, which advantageously—but not necessarily—forms an angle σ of 90° with the axial contact surface 39. In FIG. 13, it is seen that the axial contact surface 39 in a cavity in an arbitrary clearance surface (e.g. 30c) suitably forms a right angle ε with a nearby clearance surface (30d) adjacent to one and the same corner (31y). When the last-mentioned clearance surface (30d) is held pressed against the radial support surface 18 of the seat 17, the axial contact surface 39 will accordingly obtain surface contact with the axial support surface 20 because the tightening screw 25 applies tightening force components to the cutting insert not only in the radial direction, but also axially in relation to the tool head.

The width of the individual cavity 38, counted as the distance between the side surfaces 40, is somewhat greater than the width of the step 21 (as counted between its side surfaces). In the example shown, the width of the cavity 38 is, on the other hand, considerably smaller than the width of the clearance surface 30 (as counted between the chip surfaces 29), which means that the cavity, in this case, is surrounded from all sides by the clearance surface. In this connection, it should however be pointed out that the cavity also could have the character of a groove that extends along the entire width of the clearance surface and opens in the opposite chip surfaces.

Figure 14:
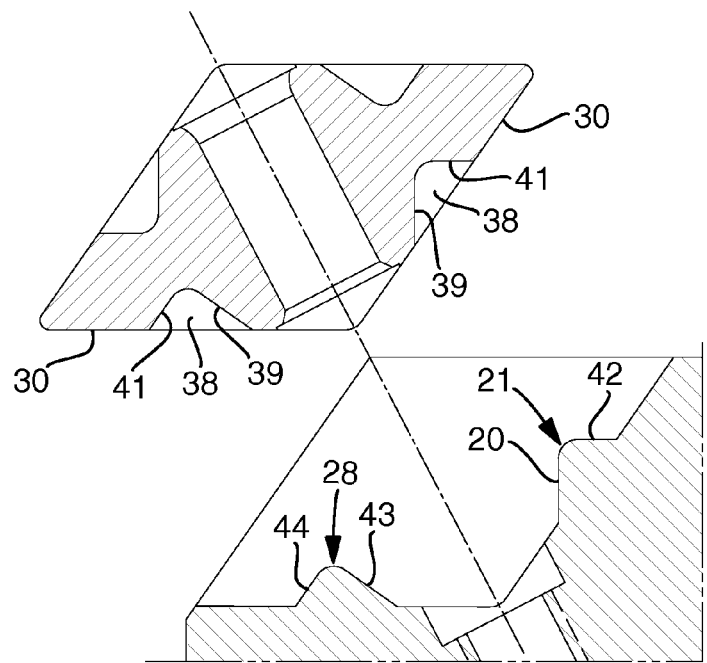
FIG. 14 is an enlarged exploded view showing the cutting insert and parts of the seat in longitudinal section and separated from each other.
Figure 15:
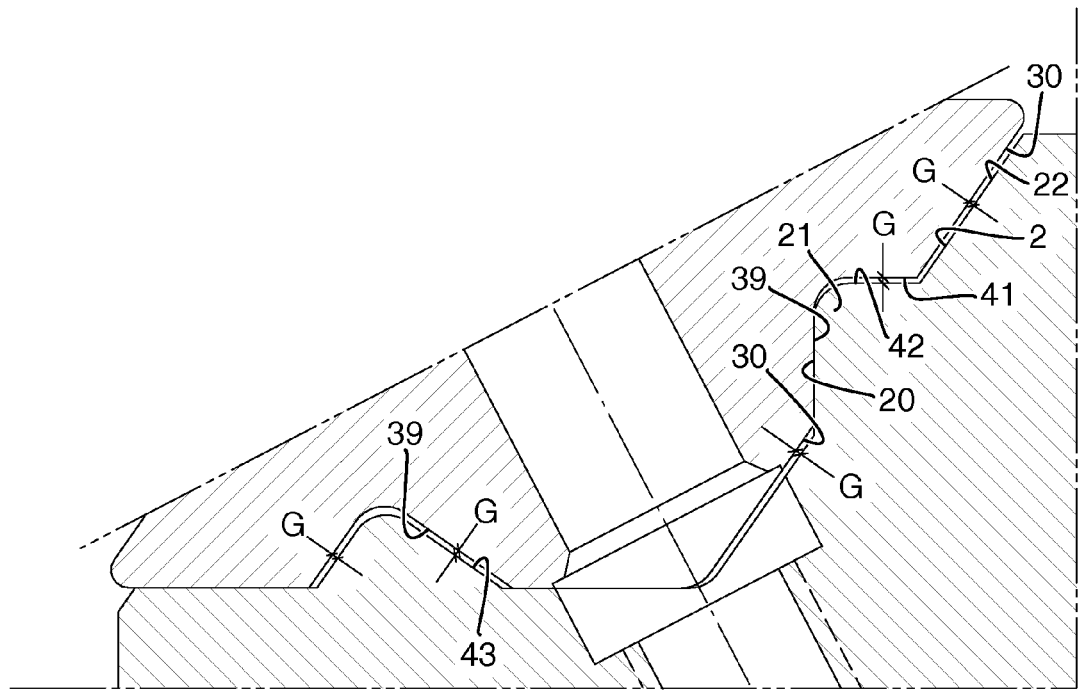
FIG. 15 is an enlarged longitudinal section of an obtuse corner of the cutting insert in the mounted state thereof.

Reference is now made to FIGS. 14 and 15, in which it is seen that the axial contact surface 39 in the cavity 38 in the mounted state of the cutting insert is in contact with the axial support surface 20 of the step 21. However, the upper side 42 of the step 21 has no contact with the clearance surface 41 in the cavity 38. Neither is the clearance surface 30 of the cutting insert in contact with the slope surface 22 of the seat. In practice, the play or the gap G may amount to a few hundredths or tenths of a millimeter. For instance, G may be within the range of 0.02-0.25 mm, preferably 0.05-0.10 mm.

Furthermore, it should be noted that the cross-sectional shape of the stop lug 28 is without exception smaller than the corresponding (triangular) cross-sectional shape in the cavity 38. In such a way, the two limiting surfaces 43, 44 on the stop lug 28 will normally clear from the two surfaces 39, 41 in the cavity. Also here, the play G between the pairs of surfaces may amount to at most 0.25 mm.

When the cutting insert during operation is held pressed against the seat by the cutting forces (a clearance surface 30 against the radial support surface 18, an inactive chip surface 29 against the tangential support surface 19, and the axial contact surface 39 against the axial support surface 20), the shoulder surface 43 on the stop lug and the axial contact surface 39 in the co-operating cavity latently form a securing function, which in no way disturbs the normal fixation of the cutting insert in the seat. However, should a mishap occur, so far that the tool head would need to be retracted out of the machined hole and the cutting insert thereby would be subjected to reversed forces that aim to distance the same from primarily the axial support surface 20 but also the tangential support surface 19, the securing function will quickly be activated and retain the cutting insert very near its original, fixed position. This effected by the axial contact surface 39 in the cavity in question immediately being pressed against the shoulder surface 43 on the stop lug 28. In practice, this means that the reversed axial forces that act on the cutting insert are quickly absorbed by the stop lug rather than by the tightening screw 25 (provided that the screw can continue to press the cutting insert against the radial support surface 18). In order to guarantee a quick activation of the securing function and thereby avoid fatigue of the screw, the gap G should at all events amount to at most 0.25 mm, suitably at most 0.15 mm, and most preferably be within the above-mentioned interval of 0.05-0.10 mm.

A primary advantage of exemplary embodiments of the disclosed reaming insert is that the rhombic basic shape thereof allows usage of four cutting edges in spite of the volume of the cutting insert having been reduced to a minimum in comparison with previously known reaming inserts. In other words, the cutting insert guarantees good economy for the user. In addition, possible extraction of the tool out of a machined hole is significantly facilitated and the waste of time to managing possible mishaps that require such extractions is reduced. By the fact that the volume of the cutting inserts has been minimized, the exemplary embodiments of the disclosed reaming tool can moreover be constructed for very small hole diameters.

Feasible Modifications:

The invention is not limited only to the embodiment described above and shown in the drawings. Accordingly, the cutting insert may be fixed in the appurtenant seat by means of other clamping members than a screw, e.g. clamps, wedges or tightening fingers. Neither is the latent securing function, preferred per se, required, as well as neither the fact that co-operating axial contact surfaces and axial support surfaces, respectively, have been formed in cavities in the cutting insert and on a step along the slope surface, respectively. Accordingly, it is feasible to utilize the proper slope surface as axial support surface, in particular if the obtuse angle between the slope surface and the radial support surface is limited, so that the slope surface runs steeper in relation to the radial support surface than in the example shown. Neither does the angle between the chip surfaces and the individual clearance surface need to be right. Within the scope of the invention, it is furthermore possible to vary the obtuse angles of the rhomb (and acute angles, respectively) within fairly wide limits. When the axial support surface is arranged on a step along the slope surface, the obtuse angle should, however, amount to at most 160° and at least 110°. Furthermore, the cutting insert and the seat may be formed so that the radial cutting forces are carried by a portion of a clearance surface (the portion to the left of the stop lug 28 in FIG. 15) as well as by contact between the surfaces 41, 42. In addition, the tool may be made so that the same can be pushed instead of being pulled through the hole to be reamed. Also, the mechanical coupling between the tool and the drawbar or connecting rod may have another shape than the one shown. For instance, a coupling of the type COROMANT CAPTO® may be used.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A reaming tool, comprising:
   a driving rod;
   a head that has a rotationally symmetrical basic shape and is equipped with one or more detachable cutting inserts; and
   a clamping member for each of the one or more detachable cutting inserts,
   wherein the head comprises front and rear end surfaces, an envelope surface concentric with a centre axis (C), and a seat for each of the one or more detachable cutting inserts, each seat countersunk in the envelope surface and includes three support surfaces, one of which is a radial support surface and another one a tangential support surface,
   wherein each detachable cutting insert is held fixed in the seat by means of the clamping member,
   wherein each detachable cutting insert has the shape of a mirror-symmetrical polyhedron comprising six limiting surfaces, two opposite and mutually parallel ones of which are equidistantly separated from a central symmetry plane (SP1) and form chip surfaces that connect to limiting surfaces serving as clearance surfaces via alternately usable, identical cutting edges,
   wherein each detachable cutting insert has a rhombic cross-sectional shape in the symmetry plane (SP1) and includes four clearance surfaces, which meet each other in pairs at obtuse angles ($\beta$) in two opposite corners, and which, along each individual chip surface, together with the same, form two cutting edges alternately usable by the indexing of the detachable cutting insert, and
   wherein each seat, in addition to the radial and tangential support surfaces, includes a slope surface that forms an obtuse angle with the radial support surface.

2. The reaming tool according to claim 1, wherein an axial support surface is included in a step formed along the slope surface, and that, in each one of the clearance surfaces of the cutting insert, a cavity is countersunk having an axial contact surface that is pressed against the axial support surface of the step.

3. The reaming tool according to claim 2, wherein the axial support surface of the seat forms an angle of 70-110° with the radial support surface, and that the axial contact surface, in the cavity countersunk in a first clearance surface, forms the same angle with a nearby, second clearance surface that connects to one and the same obtuse corner as the first one.

4. The reaming tool according to claim 1, wherein the clamping member is a screw made with a male thread and a head and located in a through hole between the obtuse-angled corners of the cutting insert, the male thread of the screw being tightened in a female thread included in a hole that mouths in the transition between the radial support surface and slope surface of the seat.

5. The reaming tool according to claim 4, wherein the through hole includes ring-shaped countersinks in each one of the two opposite ends thereof on order to house the screw head irrespective of the index position of the cutting insert in the seat.

6. The reaming tool according to claim 1, wherein the angle (β) between the two clearance surfaces that meet each other in an obtuse corner, as well as the obtuse angle between the radial support surface and slope surface of the seat, amounts to at least 110° and at most 160°.

7. The reaming tool according to claim 1, wherein the individual clearance surface forms a right angle with the individual chip surface, and that the radial and tangential support surfaces of the seat form a right angle with each other.

8. A reaming insert for a reaming tool, comprising:
   four clearance surfaces
wherein the reaming insert has a shape of a mirror-symmetrical polyhedron comprising six limiting surfaces, two opposite and mutually parallel ones of which are equidistantly separated from a central symmetry plane (SP1) and serve as chip surfaces that connect to limiting surfaces serving as clearance surfaces via alternately usable cutting edges,
wherein the reaming insert has a rhombic cross-sectional shape in the symmetry plane (SP1),
wherein the four clearance surfaces meet each other in pairs at obtuse angles (β) in two opposite corners, and which, along each individual chip surface, together with the same, form two cutting edges alternately usable by the indexing of the cutting insert, and
wherein, in each one of the clearance surfaces, a cavity is countersunk that comprises an axial contact surface.

9. The reaming insert according to claim 8, wherein each individual axial contact surface, in a cavity countersunk in a first clearance surface, forms a right angle with a nearby, second clearance surface that connects to one and the same obtuse corner as the first one.

10. The reaming insert according to claim 8, wherein said obtuse angle (β) amounts to at least 110° and at most 160°.

11. The reaming insert according to claim 8, including a through hole that extends between the obtuse-angled corners.

12. The reaming insert according to claim 11, wherein the hole is solitary and located in the symmetry plane (SP1).

13. The reaming insert according to claim 11, including countersinks for a screw head formed in each one of the opposite ends of the hole.

14. A rotationally symmetrical tool head for a reaming tool comprising:
   front and rear end surfaces;
   an envelope surface concentric with a centre axis (C); and
   a seat for the receipt of a cutting insert, the seat countersunk in the envelope surface and includes three support surfaces, one of which is a radial support surface and another one a tangential support surface,
wherein the seat, in addition to said radial and tangential support surfaces, includes a slope surface that forms an obtuse angle with the radial support surface, and
wherein the tool head includes axially extending evacuation channels in the envelop surface, and wherein the radial support surface transforms into one of the evacuation channels at a boundary line, the boundary line situated at a distance from the tangential support surface and running approximately parallel to the tangential support.

15. The tool head according to claim 14, wherein a third support surface in the form of an axial support surface is included in a step formed along the slope surface.

16. The tool head according to claim 15, wherein the axial support surface of the step forms a right angle with the radial support surface and an acute angle with the slope surface.

* * * * *